(12) United States Patent
Stanescu et al.

(10) Patent No.: US 12,603,838 B2
(45) Date of Patent: Apr. 14, 2026

(54) OPTIMIZING NETWORK LOAD IN MULTICAST COMMUNICATIONS

(71) Applicant: LENOVO GLOBAL TECHNOLOGY (UNITED STATES) INC., Morrisville, NC (US)

(72) Inventors: George-Andrei Stanescu, Ilfov (RO); Corneliu-Ilie Calciu, Bucharest (RO); Radu Mihai Iorga, Bucharest (RO)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 329 days.

(21) Appl. No.: 17/709,604

(22) Filed: Mar. 31, 2022

(65) Prior Publication Data

US 2023/0318969 A1 Oct. 5, 2023

(51) Int. Cl.
| | |
|---|---|
| *H04L 45/42* | (2022.01) |
| *H04L 12/18* | (2006.01) |
| *H04L 45/00* | (2022.01) |
| *H04L 45/12* | (2022.01) |

(52) U.S. Cl.
CPC .......... *H04L 45/42* (2013.01); *H04L 12/1886* (2013.01); *H04L 45/123* (2013.01); *H04L 45/566* (2013.01)

(58) Field of Classification Search
CPC ... H04L 45/42; H04L 12/1886; H04L 45/123; H04L 45/566
USPC ......................................................... 709/238
See application file for complete search history.

(56) References Cited

U.S. PATENT DOCUMENTS

| | | | |
|---|---|---|---|
| 8,437,351 B2 * | 5/2013 | Tempia Bonda | ....... H04L 45/48 370/240 |
| 8,612,621 B2 * | 12/2013 | Wang | .................... H04L 67/104 709/231 |
| 8,644,310 B2 * | 2/2014 | Fernandez Gutierrez | .................. H04L 12/1886 370/392 |

(Continued)

FOREIGN PATENT DOCUMENTS

| | | | | |
|---|---|---|---|---|
| CN | 1499794 A | * | 5/2004 | ............. H04L 45/16 |
| CN | 102025517 A | * | 4/2011 | |

(Continued)

OTHER PUBLICATIONS

G. Mirsky and X. Ji. "Fast Failover in Protocol Independent Multicast—Sparse Mode (PIM-SM) Using Bidirectional Forwarding Detection (BFD) for Multipoint Networks," RFC 9186, Jan. 2022, pp. 1-7. (Year: 2022).*

(Continued)

*Primary Examiner* — Melvin H Pollack

(57) ABSTRACT

Optimizing network load in multicast communications including receiving, at a first interface of a first router from a second router, a multicast packet for a multicast group; determining whether a time to live (TTL) value of the multicast packet is equal to zero; and sending, in response to determining that the TTL value of the multicast packet is equal to zero, a Protocol Independent Multicast prune message on the first interface of the first router, wherein the Protocol Independent Multicast prune message comprises a request to stop receiving multicast traffic for the multicast group.

20 Claims, 4 Drawing Sheets

(56) References Cited

U.S. PATENT DOCUMENTS

| | | | | |
|---|---|---|---|---|
| 8,761,044 | B2 * | 6/2014 | Chandrashekharachar Suvarneshwar | H04L 12/185 370/254 |
| 8,767,587 | B1 * | 7/2014 | Finn | H04L 41/12 370/255 |
| 8,873,377 | B2 * | 10/2014 | Singatwaria | H04L 41/0672 370/220 |
| 8,995,301 | B1 * | 3/2015 | Miller | H04L 45/14 370/338 |
| 9,179,199 | B2 * | 11/2015 | Alsina | H04N 21/4333 |
| 9,215,082 | B2 * | 12/2015 | Liu | H04L 45/24 |
| 9,246,797 | B2 * | 1/2016 | Kumar | H04L 45/28 |
| 9,325,513 | B2 * | 4/2016 | Liu | H04L 45/123 |
| 9,356,789 | B1 * | 5/2016 | Peter | H04L 65/611 |
| 9,712,332 | B2 * | 7/2017 | Kalkunte | H04L 43/08 |
| 9,806,895 | B1 * | 10/2017 | Kommula | H04L 45/745 |
| 9,898,317 | B2 * | 2/2018 | Nakil | H04L 41/0895 |
| 9,923,970 | B2 * | 3/2018 | Bestler | H04L 67/1097 |
| 9,948,474 | B2 * | 4/2018 | Kobayashi | H04L 45/16 |
| 9,998,292 | B2 * | 6/2018 | Asthana | H04L 65/611 |
| 9,998,955 | B1 * | 6/2018 | MacCarthaigh | H04L 65/611 |
| 10,097,372 | B2 * | 10/2018 | Bhattacharya | H04L 41/342 |
| 10,264,040 | B2 * | 4/2019 | Manohar | H04L 45/16 |
| 10,270,604 | B2 * | 4/2019 | Nagarajan | H04L 41/0213 |
| 10,355,923 | B2 * | 7/2019 | Oedlund | H04W 48/16 |
| 10,389,618 | B2 * | 8/2019 | Ou | H04L 45/16 |
| 10,397,094 | B2 * | 8/2019 | Karthikeyan | H04L 12/18 |
| 10,432,414 | B2 * | 10/2019 | Johnsen | H04L 41/0893 |
| 10,491,411 | B2 * | 11/2019 | Bartier | H04L 47/806 |
| 10,511,694 | B2 * | 12/2019 | Goyal | G06F 9/5055 |
| 10,608,931 | B1 * | 3/2020 | Kumar | H04L 12/4641 |
| 10,652,036 | B2 * | 5/2020 | Bartier | H04L 45/04 |
| 10,917,352 | B1 * | 2/2021 | Hanes | H04L 47/32 |
| 10,944,669 | B1 * | 3/2021 | Ramanathan | H04L 45/20 |
| 10,951,428 | B2 * | 3/2021 | Seth | H04L 67/10 |
| 10,958,564 | B1 * | 3/2021 | Asthana | H04L 45/20 |
| 11,018,886 | B1 * | 5/2021 | Wijnands | H04L 12/185 |
| 11,057,235 | B1 * | 7/2021 | Varahabhotla | H04L 12/185 |
| 11,070,386 | B2 * | 7/2021 | Kebler | H04L 12/1886 |
| 11,082,324 | B2 * | 8/2021 | Ramanathan | H04L 69/22 |
| 11,139,995 | B2 * | 10/2021 | Zhang | H04L 43/0811 |
| 11,165,743 | B2 * | 11/2021 | Warrick | H04L 12/1886 |
| 11,190,367 | B2 * | 11/2021 | Meng | H04L 12/1886 |
| 11,197,343 | B2 * | 12/2021 | Thiebaut | H04W 76/40 |
| 11,283,639 | B2 * | 3/2022 | Nandy | H04L 45/02 |
| 11,303,727 | B2 * | 4/2022 | Bansal | H04L 43/028 |
| 11,323,510 | B2 * | 5/2022 | Yevmenkin | H04L 67/101 |
| 11,329,912 | B2 * | 5/2022 | Kaplan | H04L 45/28 |
| 11,343,137 | B2 * | 5/2022 | Chandramohan | H04L 41/0668 |
| 11,374,778 | B2 * | 6/2022 | Meng | H04L 12/189 |
| 11,405,307 | B2 * | 8/2022 | Zhang | H04L 12/1886 |
| 11,411,857 | B2 * | 8/2022 | Shen | H04L 12/185 |
| 11,425,026 | B2 * | 8/2022 | Dutta | H04L 12/1886 |
| 11,431,635 | B2 * | 8/2022 | Basavaraj | H04L 47/125 |
| 11,451,468 | B2 * | 9/2022 | Mishra | H04L 45/34 |
| 11,483,236 | B2 * | 10/2022 | Dutta | H04L 45/50 |
| 11,489,714 | B2 * | 11/2022 | Nandy | H04L 43/0811 |
| 11,496,329 | B2 * | 11/2022 | Nagarajan | H04L 12/1886 |
| 11,496,391 | B1 * | 11/2022 | Przygienda | H04L 45/745 |
| 11,509,494 | B2 * | 11/2022 | Mishra | H04L 45/50 |
| 11,516,115 | B2 * | 11/2022 | N | H04L 45/28 |
| 11,546,874 | B1 * | 1/2023 | Martin | H04W 4/06 |
| 11,553,018 | B2 * | 1/2023 | Mao | H04L 65/762 |
| 11,561,823 | B1 * | 1/2023 | Loganathan | G06F 9/52 |
| 11,570,098 | B2 * | 1/2023 | Ignatchenko | H04L 47/2416 |
| 11,582,054 | B2 * | 2/2023 | Jyoti | H04L 12/185 |
| 11,601,295 | B2 * | 3/2023 | Kumar M R | H04L 67/60 |
| 11,606,287 | B2 * | 3/2023 | Stevens | H04L 45/16 |
| 11,616,715 | B2 * | 3/2023 | Dutta | H04L 45/48 370/390 |
| 11,792,044 | B2 * | 10/2023 | Dutta | H04L 12/4641 370/254 |
| 11,811,555 | B2 * | 11/2023 | Chu | H04L 45/16 |
| 11,811,642 | B2 * | 11/2023 | Ramanathan | H04L 47/286 |

| | | | | |
|---|---|---|---|---|
| 2009/0116484 | A1 * | 5/2009 | Buford | H04L 45/00 370/392 |
| 2011/0188499 | A1 * | 8/2011 | Wijnands | H04L 45/00 370/390 |
| 2012/0188934 | A1 * | 7/2012 | Liu | H04L 41/083 370/312 |
| 2013/0094445 | A1 * | 4/2013 | De Foy | H04L 45/021 370/328 |
| 2013/0227336 | A1 * | 8/2013 | Agarwal | H04L 45/02 714/4.3 |
| 2014/0016457 | A1 * | 1/2014 | Enyedi | H04L 45/22 370/225 |
| 2014/0348022 | A1 * | 11/2014 | Jain | H04L 41/12 370/254 |
| 2014/0369177 | A1 * | 12/2014 | Keesara | H04L 43/0811 370/216 |
| 2015/0146603 | A1 * | 5/2015 | Wu | H04L 65/611 370/312 |
| 2015/0236752 | A1 * | 8/2015 | Cruz | H04L 63/1441 375/135 |
| 2016/0323116 | A1 * | 11/2016 | Garofalo | H04L 12/1868 |
| 2018/0367451 | A1 * | 12/2018 | Gulrajani | H04L 45/54 |
| 2019/0020492 | A1 * | 1/2019 | Boutros | H04L 12/1886 |
| 2019/0058635 | A1 * | 2/2019 | Nandy | H04L 45/48 |
| 2019/0215170 | A1 * | 7/2019 | Holbrook | H04L 12/185 |
| 2019/0268256 | A1 * | 8/2019 | Mirsky | H04L 43/10 |
| 2020/0177402 | A1 * | 6/2020 | Mishra | H04L 45/50 |
| 2020/0220742 | A1 * | 7/2020 | Zhang | H04L 43/0811 |
| 2020/0228356 | A1 * | 7/2020 | Meng | H04L 12/18 |
| 2020/0245206 | A1 * | 7/2020 | Allan | H04L 45/04 |
| 2021/0014128 | A1 * | 1/2021 | Mereddy | H04L 41/0853 |
| 2021/0036952 | A1 * | 2/2021 | Pattabhiraman | H04L 63/101 |
| 2021/0099379 | A1 * | 4/2021 | Kaliyamoorthy | H04L 45/18 |
| 2021/0320837 | A1 * | 10/2021 | Nandy | H04L 45/28 |
| 2021/0344591 | A1 * | 11/2021 | Kondalam | H04L 12/18 |
| 2021/0351947 | A1 * | 11/2021 | Liu | H04L 45/48 |
| 2021/0377153 | A1 * | 12/2021 | Chhibber | H04L 45/16 |
| 2022/0046515 | A1 * | 2/2022 | Zhang | H04W 24/04 |
| 2022/0060407 | A1 * | 2/2022 | N | H04L 12/1854 |
| 2022/0060412 | A1 * | 2/2022 | Dutta | H04L 45/04 |
| 2022/0078108 | A1 * | 3/2022 | Stevens | H04L 45/16 |
| 2022/0191128 | A1 * | 6/2022 | Alverson | H04L 49/90 |
| 2022/0247585 | A1 * | 8/2022 | N | H04L 12/18 |
| 2022/0337441 | A1 * | 10/2022 | Chhibber | H04L 12/1886 |
| 2022/0417287 | A1 * | 12/2022 | Joshi | H04L 63/105 |
| 2023/0006922 | A1 * | 1/2023 | Karunakaran | H04L 12/1886 |
| 2023/0022760 | A1 * | 1/2023 | Nandy | H04L 12/1886 |
| 2023/0074838 | A1 * | 3/2023 | De Foy | H04L 69/164 |
| 2023/0275949 | A1 * | 8/2023 | Kwon | H04L 12/1886 709/227 |

FOREIGN PATENT DOCUMENTS

| | | | | | |
|---|---|---|---|---|---|
| CN | | 112737956 | A | * | 4/2021 | H04L 12/18 |
| CN | | 113259252 | A | * | 8/2021 | H04L 1/08 |

OTHER PUBLICATIONS

B Fenner et al. "Protocol Independent Multicast—Sparse Mode (PIM-SM): Protocol Specification (Revised)," RFC 7761 aka STD 83 , Mar. 2016, pp. 1-137. (Year: 2016).*

A. Adams et al. "Protocol Independent Multicast—Dense Mode (PIM-DM): Protocol Specification (Revised)," RFC 3973, Jan. 2005, pp. 1-61. (Year: 2005).*

Jain, V. (2022). Analyzing Control Plane Traffic. In: Wireshark Fundamentals. Apress, Berkeley, CA. https://doi.org/10.1007/978-1-4842-8002-7_5 (Year: 2022).*

J.-P. Sheu and Y.-C. Chen, "A scalable and bandwidth-efficient multicast algorithm based on segment routing in software-defined networking," 2017 IEEE International Conference on Communications (ICC), 2017, pp. 1-6, doi: 10.1109/ICC.2017.7997197. (Year: 2017).*

H. Soni, W. Dabbous, T. Turletti and H. Asaeda, "NFV-Based Scalable Guaranteed-Bandwidth Multicast Service for Software Defined ISP Networks," in IEEE Transactions on Network and

(56) References Cited

OTHER PUBLICATIONS

Service Management, vol. 14, No. 4, pp. 1157-1170, Dec. 2017, doi: 10.1109/TNSM.2017.2759167. (Year: 2017).*

H. Soni, W. Dabbous, T. Turletti and H. Asaeda, "Scalable guaranteed-bandwidth multicast service in software defined ISP networks," 2017 IEEE International Conference on Communications (ICC), 2017, pp. 1-7, doi: 10.1109/ICC.2017.7996652. (Year: 2017).*

J.-J. Kuo, S.-H. Chiang, S.-H. Shen, D.-N. Yang and W.-T. Chen, "Dynamic Multicast Traffic Engineering with Efficient Rerouting for Software-Defined Networks," IEEE Infocom 2019—IEEE Conference on Computer Communications, 2019, pp. 793-801, doi: 10.1109/Infocom.2019.8737563. (Year: 2019).*

Adams et. al, Protocol Independent Multicast-Dense Mode (PIM-DM): Protocol Specification (Revised), Internet Engineering Task Force, Jan. 2005, URL: https://tools.ietf.org/html/rfc3973, 61 pages.

Dooley et. al, Controlling Multicast Scope with TTL, Cisco IOS Cookbook, 2021, O'Reilly Media, Inc., Sebastopol, California, USA, URL: https://www.oreilly.com/library/view/cisco-ios-cookbook/0596527225/ch23s15.html, 3 pages.

Fenner et al., Protocol Independent Multicast-Sparse Mode (PIM-SM): Protocol Specification (Revised), Mar. 2016, Internet Engineering Task Force, URL: https://tools.ietf.org/html/rfc7761, 137 pages.

Johnston, ASA Multicast Troubleshooting and Common Problems, Feb. 5, 2013, Cisco Systems, Inc., San Jose, California, USA, URL: https://www.cisco.com/c/en/us/support/docs/security/asa-5500-x-series-next-generation-firewalls/115804-asa-multi-probs-00.html, 12 pages.

Juniper Networks, Inc., PIM Overview, Jusos OS Multicast Protocols User Guide, Jul. 7, 2021, Juniper Networks, Inc., Sunnyvale, California, USA, URL: https://www.juniper.net/documentation/en_US/junos/topics/concept/multicast-pim-overview.html, 2610 pages.

Postel, Internet Control Message Protocol, Sep. 1981, Internet Engineering Task Force, URL: https://tools.ietf.org/html/rfc792, 21 pages.

* cited by examiner

OPTIMIZING NETWORK LOAD IN MULTICAST COMMUNICATIONS

BACKGROUND

Field of the Invention

The field of the disclosure is data processing, or, more specifically, methods, apparatus, and products for optimizing network load in multicast communications.

Description of Related Art

In computer networking, multicast is group communication where data transmission is addressed to a group of destination computers simultaneously. In multicast communications, multicast traffic may be sent to multiple recipients through routers in the form of multicast packets. Such multicast packets may not reach all of the intended recipients due to their time to live (TTL) terminating before reaching the target recipient.

SUMMARY

Methods, apparatus, and products for optimizing network load in multicast communications according to various embodiments are disclosed in this specification. Such optimizing network load in multicast communications may include: receiving, at a first interface of a first router from a second router, a multicast packet for a multicast group; determining whether a TTL value of the multicast packet is equal to zero; and sending, in response to determining that the TTL value of the multicast packet is equal to zero, a Protocol Independent Multicast prune message on the first interface of the first router, wherein the Protocol Independent Multicast prune message comprises a request to stop receiving multicast traffic for the multicast group.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
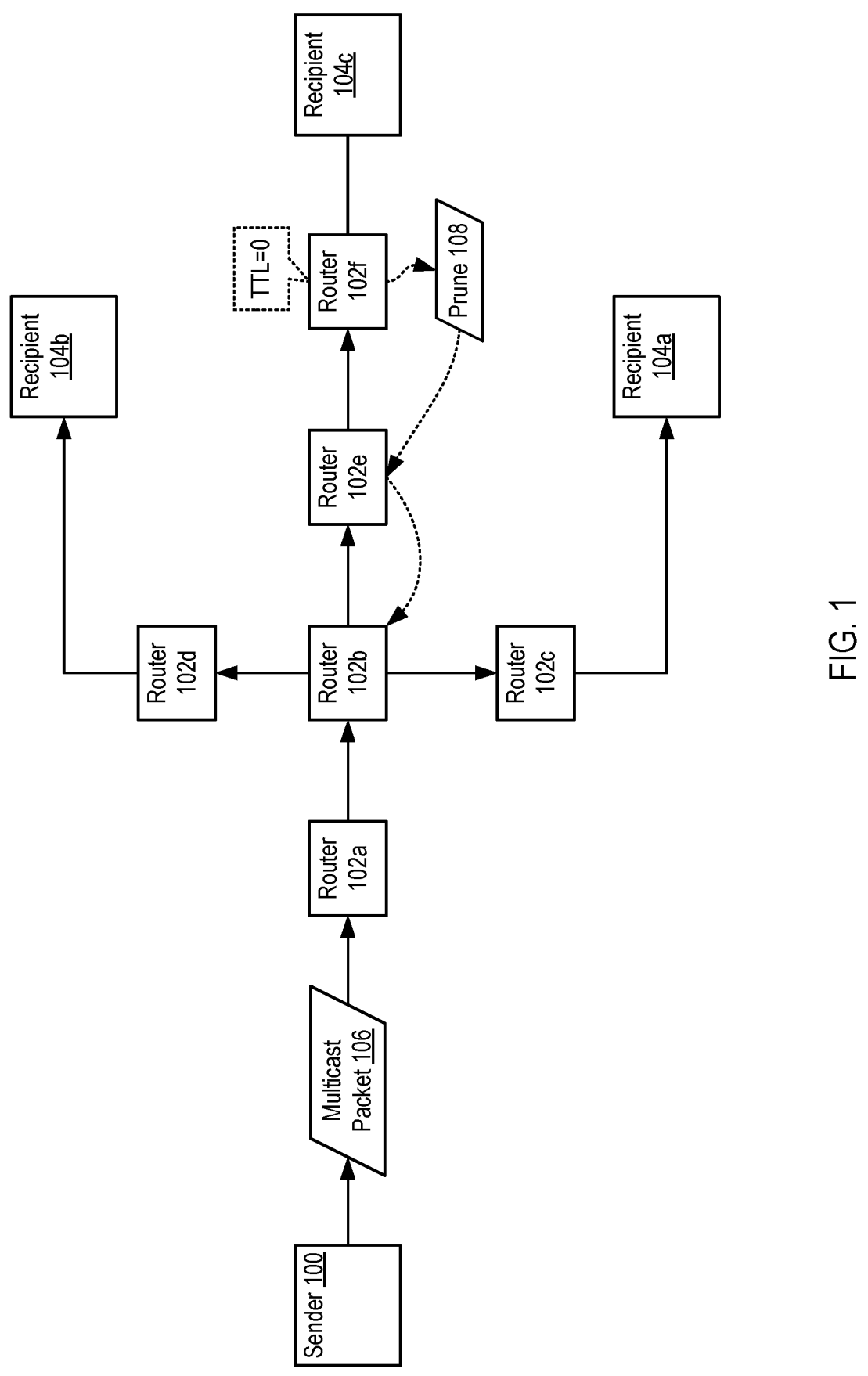
FIG. 1 shows a block diagram of an example sender sending multicast traffic to multiple recipients through multiple routers in accordance with embodiments of the present disclosure.

Exemplary methods, apparatus, and products for optimizing network load in multicast communications in accordance with the present disclosure are described with reference to the accompanying drawings, beginning with FIG. 1. FIG. 1 sets forth an example block diagram of a system configured for optimizing network load in multicast communications according to embodiments of the present disclosure. The example system of FIG. 1 includes a sender 100 connected to a number of recipients 104 through a number of routers 102. The sender 100 and the recipients 104 each include software and hardware capable of computing functions, and may be embodied as a server, workstation, storage array, and the like.

The example sender 100 of FIG. 1 may send multicast traffic to a number of recipients 104, such as example recipients 104a, 104b, and 104c, through a number of routers 102, such as example routers 102a, 102b, 102c, 102d, 102e, and 102f. The multicast traffic sent by example sender of FIG. 1 may be in the form of a multicast packet 106 sent in a stream of multicast packets. The multicast packet 106 may include an identifier (not shown in FIG. 1) of a multicast group associated with the multicast traffic. The multicast packet 106 is sent from the sender 100 to a router which then sends along the multicast packet 106 to each router between the sender 100 and the recipient 104. For example, the multicast packet 106 may be sent by the sender 100 to recipient 104a through routers 102a, 102b, and 102c.

The example multicast packet 106 may include a time to live (TTL) value. The TTL value is a mechanism which may limit the lifespan of the packet in the networks of the routers 102 and may prevent the packet from circulating indefinitely. The TTL value may be implemented as a counter or timestamp attached to or embedded in the multicast packet 106. The TTL value may be initially set by the sender 100 of the multicast packet 106, and the TTL value may be subsequently reduced by each router 102 on the route to its destination, such as one of the recipients 104 of FIG. 1. The multicast packet 106 may continue along its route to its destination until the TTL value reaches zero. In another example, the multicast packet 106 of FIG. 1 may have a TTL value initially set to 4 by the sender 100 and be sent to recipient 104b through routers 102a, 102b, and 102c. In such an example, the multicast packet will have its TTL value reduced once by each of routers 102a, 102b, and 102c and reach recipient 104c before its TTL value has been reduced to zero.

A packet whose TTL value reaches zero before getting to its destination will not reach that destination. Consider an example in which the multicast packet 106 of FIG. 1 has a TTL value initially set to 4 by the sender 100 and is sent to recipient 104c through routers 102a, 102b, 102e, and 102f. In such an example, the multicast packet will have its TTL value reduced once by each of routers 102a, 102b, 102e, and 102f, with router 102f decrementing the TTL value of the multicast packet from one to zero. In such an example, the multicast packet 106 will not reach its intended destination of recipient 104c because the multicast packet's TTL value reaches zero before being delivered.

In unicast communication, the router which detects that the TTL value reaches zero may send an Internet Control Message Protocol (ICMP) Time Exceeded message back to the sender of the packet to notify the sender of the situation and so that the sender may stop sending the traffic that is not reaching the intended destination, thereby reducing the unnecessary use of network recourses. However, in multicast communications, such an ICMP Time Exceeded message may be ignored by the sender whose multicast traffic is still reaching other recipients. In the above example when multicast traffic does not reach one of the multiple recipients due to the TTL value of a packet reaching zero, unnecessary resources are wasted to continue to attempt to direct the multicast traffic to a recipient which cannot be reached. In order to optimize network load in multicast communications according to embodiments of the present disclosure, a router may send a Protocol Independent Multicast prune message 108 upstream in response to the TTL value of the multicast packet 106 reaching zero.

Protocol Independent Multicast is a family of multicast routing protocols for Internet Protocol (IP) networks that provide one-to-many and many-to-many distribution of data over a local area network (LAN), wide area network (WAN) or the Internet. Protocol Independent Multicast is termed protocol-independent because it does not include its own topology discovery mechanism, but instead uses routing information supplied by other routing protocols. Protocol Independent Multicast is not dependent on a specific unicast routing protocol and can make use of any unicast routing protocol in use on the network. The example Protocol Independent Multicast prune message 108 of FIG. 1 may include a request to stop receiving the multicast traffic for the multicast group identified in the multicast packet 106 and is sent upstream from the multicast traffic. Continuing with the above example of a multicast packet sent to recipient 104c whose TTL value reaches zero at router 102f, router 102f may, in response to the TTL value of the multicast packet 106 reaching zero, send a Protocol Independent Multicast prune message 108 upstream the multicast traffic to router 102e requesting to stop receiving the multicast traffic. In stopping router 102f from receiving the multicast traffic, router 102f reduces inefficient bandwidth utilization between router 102f and router 102e, thereby reducing the use of unnecessary resources to process multicast traffic that will not reach the intended recipient; namely recipient 104c.

Continuing with the above example, router 102e may receive the Protocol Independent Multicast prune message 108 from router 102f and subsequently stop sending the multicast traffic to router 102f. Router 102e may continue by determining whether there are any other recipients of the multicast traffic coupled, rather directly or indirectly, to router 102e besides recipient 104c, which router 102e is coupled to indirectly through router 102f, which sent the Protocol Independent Multicast prune message 108. In the above example of FIG. 1, router 102e may determine that no other recipients of the multicast traffic are coupled and respond by propagating the Protocol Independent Multicast prune message 108 upstream to router 102b requesting to stop receiving the multicast traffic. In stopping router 102e from receiving the multicast traffic, router 102e reduces inefficient bandwidth utilization between router 102e and router 102b, thereby reducing the use of unnecessary resources to process multicast traffic that will not reach the intended recipient; namely recipient 104c.

Continuing with the above example, router 102b may receive the Protocol Independent Multicast prune message 108 from router 102e and subsequently stop sending the multicast traffic to router 102e. Router 102b may continue by determining whether there are any other recipients of the multicast traffic coupled, rather directly or indirectly, to router 102b besides recipient 104c, which router 102b is coupled to indirectly through router 102f and router 102e, which sent the Protocol Independent Multicast prune message 108. In the above example of FIG. 1, router 102b may determine that recipients 104a and 104b of the multicast traffic are indirectly coupled to router 102b through routers 102c and 102d and respond to such a determination by taking no further action.

Figure 2:
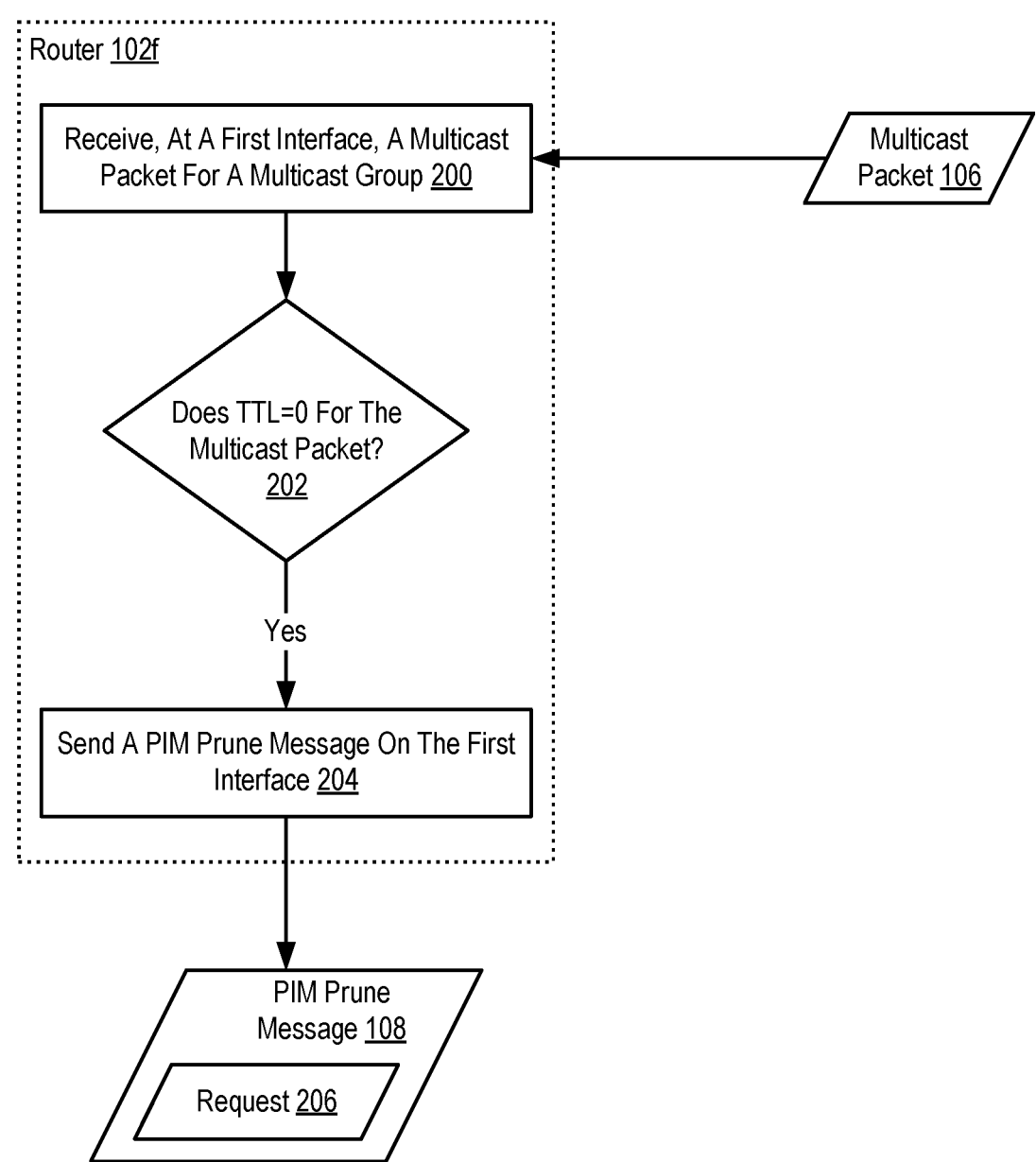
FIG. 2 is a flowchart of an example method for optimizing network load in multicast communications according to some embodiments of the present disclosure.

For further explanation, FIG. 2 sets forth a flowchart illustrating an example method of optimizing network load in multicast communications according to embodiments of the present disclosure. The method of FIG. 2 includes receiving 200, at a first interface of a first router 102f from a second router, a multicast packet 106 for a multicast group. Receiving 200 the multicast packet 106 may be carried out by the router 102f receiving the multicast packet over a network of the router 102f from a second router (not shown in FIG. 2). For example, router 102f may receive the multicast packet 106 for the multicast group at a first interface (not shown in FIG. 2) from router 102e of FIG. 1 over a network of router 102f. Although not shown in FIG. 2, the multicast packet 106 identifies the multicast group and a source IP address of the packet.

The method of FIG. 2 also includes determining 202 whether a TTL value of the multicast packet 106 is equal to zero. Determining whether TTL=0 for the multicast packet may be carried out by the router 102f checking the TTL value included in the received multicast packet and evaluating whether the TTL value is equal to zero. In determining that TTL=0 for the multicast packet 106, router 102f also determines that the multicast packet 106 will not be delivered to the intended recipient.

Responsive to determining 200 that the TTL value of the multicast packet 106 is equal to zero, the method of FIG. 2 continues by sending 204 a Protocol Independent Multicast prune message 108 on the first interface of the first router. The Protocol Independent Multicast prune message 108 comprises a request 206 to stop receiving multicast traffic for the multicast group (not shown in FIG. 2) identified in the multicast packet 106. Sending 204 the Protocol Independent Multicast prune message on the first interface of the first router may be carried out by firmware (not shown in FIG. 2) of router 102f sending the Protocol Independent Multicast prune message over the network of router 102f on the interface in which the multicast packet was received. Continuing with the example above, after router 102f determines that the multicast packet will not reach the intended recipient 104c, router 102f may send a Protocol Independent Multicast prune message upstream of the multicast traffic to indicate a request to stop receiving the multicast packet. In stopping router 102f from receiving the multicast traffic, router 102f reduces inefficient bandwidth utilization between router 102f and router 102e, thereby reducing the use of unnecessary resources to process multicast traffic that will not reach the intended recipient.

Sending 204 a Protocol Independent Multicast prune message 108 on the first interface of the first router may be carried out after determining that there are no other recipients present on the same network of the router 102f for which routing is not required to deliver the multicast packet 106. For example, a router which has a recipient present on the same network and a recipient present on a different network will not send a Protocol Independent Multicast prune message upstream of the multicast traffic, even if during the router process the TTL value reaches zero. In such an example, the multicast packet will be delivered to the recipient present on the same network as the router but will not be delivered to the recipient present on a different network, because the multicast packet will have its TTL value decremented to zero during the routing process.

Figure 3:
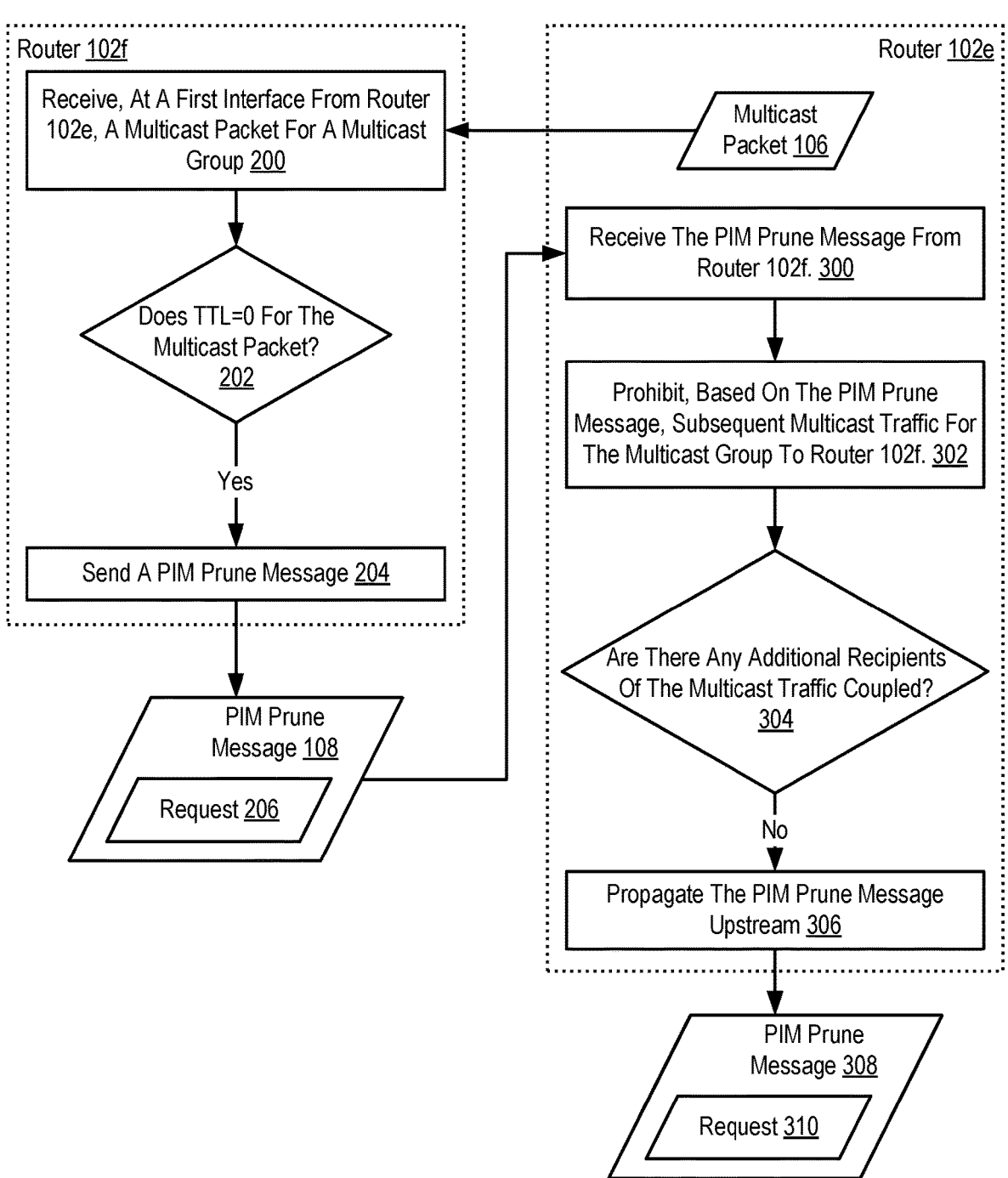
FIG. 3 is a flowchart of an example method for optimizing network load in multicast communications according to some embodiments of the present disclosure.

For further explanation, FIG. 3 sets forth a flowchart illustrating an example method of optimizing network load in multicast communications according to embodiments of the present disclosure. The method of FIG. 3 continues with the method of FIG. 2 by further including receiving 300, by the second router 102e, the Protocol Independent Multicast prune message 108 from the first router 102f. Receiving 300 the Protocol Independent Multicast prune message 108 may be carried out by the router 102e receiving, over a network, the Protocol Independent Multicast prune message including the request by router 102f to stop receiving the multicast traffic. For example, router 102e may receive the Protocol Independent Multicast prune message 108 at an interface (not shown in FIG. 3) from which the router 102e previously sent the multicast packet 106 to router 102f.

The method of FIG. 3 also includes prohibiting 302, based on the Protocol Independent Multicast prune message 108, subsequent multicast traffic for the multicast group to the first router 102f. Prohibiting 302 subsequent multicast traffic to the first router 102f may be carried out by firmware (not shown in FIG. 3) of router 102e stopping subsequent transmission of multicast traffic for the multicast group through the interface from which the Protocol Independent Multicast prune message 108 was received. For example, in response to receiving the Protocol Independent Multicast prune message 108, router 102e may evaluate subsequent multicast traffic for the multicast group and prohibit sending the multicast traffic to router 102f according to the request 206.

The method of FIG. 3 also includes determining 304, by the second router 102e, whether there are any additional recipients of the multicast traffic coupled to the second router 102e. Determining 304 whether there are any additional recipients of the multicast traffic coupled to the second router 102e may be carried out by firmware (not shown in FIG. 3) of router 102e evaluating whether any recipients 104 other than recipient 104c are coupled, rather directly or indirectly, to the router 102e. For example, router 102e may evaluate whether router 102e is directly coupled to a recipient 104 other than recipient 104c and whether router 102e is indirectly coupled to a recipient 104, such as through a number of routers. Readers of skill in the art will recognize that, in the above example of FIG. 1, router 102f is directly coupled to recipient 104c while router 102e is indirectly coupled to recipient 104c through router 102f.

Responsive to determining 304 that there are not any additional recipients of the multicast traffic coupled to the second router 102e, the method of FIG. 3 continues by propagating 306 the Protocol Independent Multicast prune message 108 upstream. Propagating 306 the Protocol Independent Multicast prune message upstream may be carried out by the router 102e sending a Protocol Independent Multicast prune message 308 over the network of router 102e on the interface in which the multicast packet 106 was received by router 102e. The Protocol Independent Multicast prune message 308 that is propagated upstream comprises a request 310 by the router 102e to stop receiving multicast traffic for the multicast group identified in the multicast packet 106. For example, after router 102e determines that it is not coupled to any additional recipients of the multicast traffic, router 102e may send the Protocol Independent Multicast prune message upstream of the multicast traffic to indicate a request to stop receiving the multicast packet. In stopping router 102e from receiving the multicast traffic, router 102e reduces inefficient bandwidth utilization between router 102e and router 102b, thereby reducing the use of unnecessary resources to process multicast traffic that will not reach the intended recipient.

Figure 4:
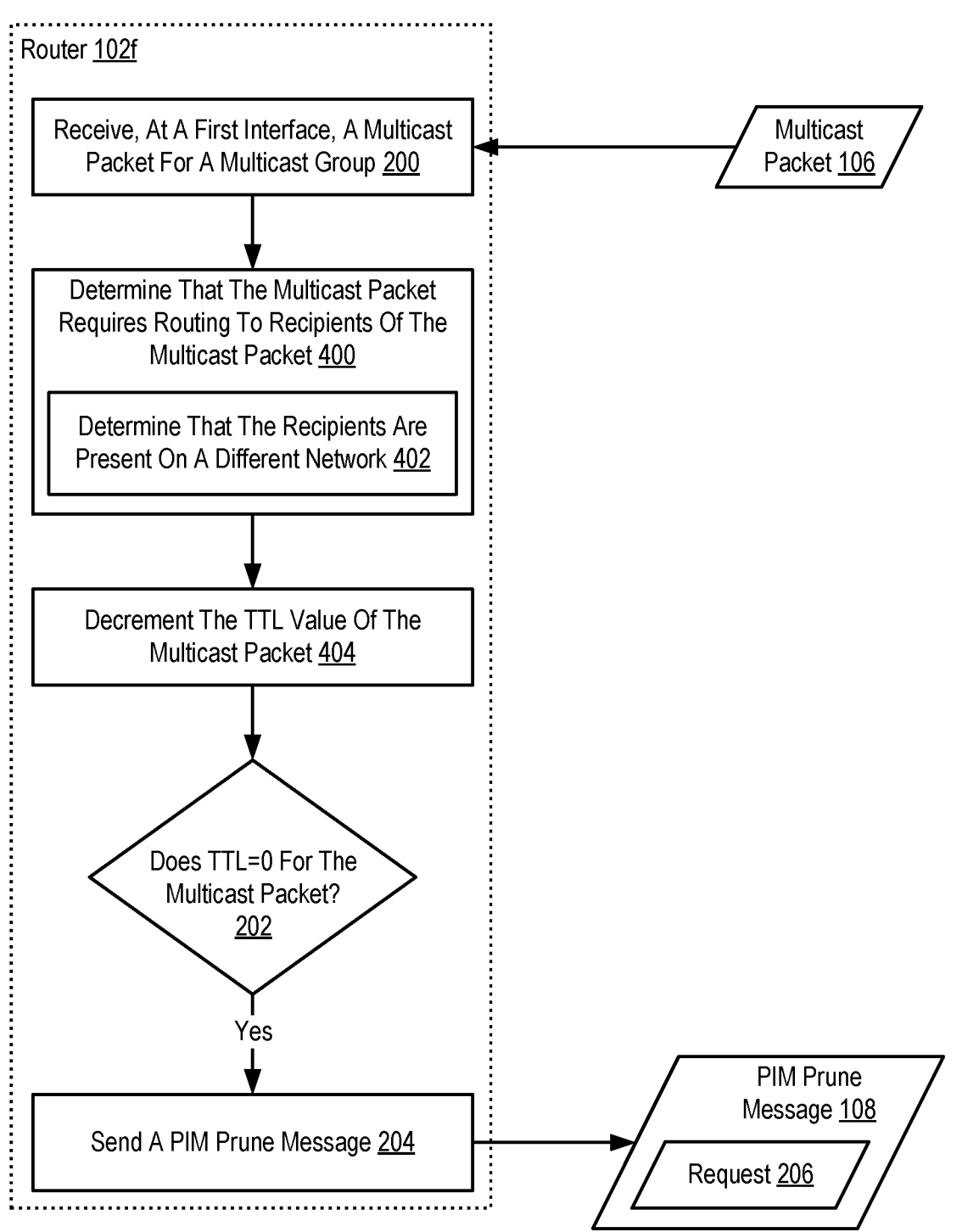
FIG. 4 is a flowchart of an example method for optimizing network load in multicast communications according to some embodiments of the present disclosure.

For further explanation, FIG. 4 sets forth a flowchart illustrating an example method of optimizing network load in multicast communications according to embodiments of the present disclosure. The method of FIG. 4 continues with the method of FIG. 2 by further including determining 400, by the first router 102f, that the multicast packet 106 requires routing to one or more recipients 104 of the multicast packet.

Determining 400 that the multicast packet requires routing may be carried out by the router 102f determining 402 that recipients of the multicast traffic are present on a different network from a network of the first router 102f. In the example system of FIG. 1, router 102f may determine 402 that recipient 104c is present on a network differing from the network in which the router 102f received the multicast packet, thereby determining 400 that the multicast packet requires routing to recipient 104c.

The method of FIG. 4 also includes decrementing 404, by the first router 102f, the TTL value in response to receiving 200 the multicast packet 106. Decrementing 404 the TTL value of the multicast packet 106 may be carried out by the router 102f reducing the TTL value by at least one unit upon receiving the multicast packet. Continuing with the example above, where the multicast packet 106 has an initial value of 4 from the sender 100, the router 102f receives the multicast packet with a TTL value of 1 and proceeds by reducing the TTL value to zero.

In view of the explanations set forth above, readers will recognize that the benefits of optimizing network load in multicast communications according to embodiments of the present disclosure include:

Reducing the network load of routers in multicast communications that are unable to deliver multicast traffic to the intended recipient by prohibiting the multicast traffic from reaching such routers.

Improving network performance by reducing the amount of unnecessary multicast traffic circulating within the network.

Exemplary embodiments of the present disclosure are described largely in the context of a fully functional computer system for optimizing network load in multicast communications. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:

receiving, at a first interface of a first router from a second router, a multicast packet for a multicast group;

determining whether a time to live (TTL) value of the multicast packet is equal to zero; and sending, in response to determining that the TTL value of the multicast packet is equal to zero, a Protocol Independent Multicast prune message on the first interface of the first router, wherein the Protocol Independent Multicast prune message comprises a request to stop receiving multicast traffic for the multicast group.

2. The method of claim 1, wherein the multicast packet identifies the multicast group and a source IP address, and wherein sending the Protocol Independent Multicast prune message comprises including in the Protocol Independent Multicast prune message the source IP address and the multicast group.

3. The method of claim 1, further comprising:

receiving, by the second router, the Protocol Independent Multicast prune message from the first router;

prohibiting, based on the Protocol Independent Multicast prune message, subsequent multicast traffic for the multicast group to the first router;

determining, by the second router, whether there are any additional recipients of the multicast traffic coupled to the second router; and propagating, in response to determining there are not additional recipients of the multicast traffic coupled to the second router, the Protocol Independent Multicast prune message upstream.

4. The method of claim 1, wherein the first router, in response to receiving the multicast packet, decrements the TTL value.

5. The method of claim 1, further comprising determining, by the first router, that the multicast packet requires routing to one or more recipients of the multicast packet.

6. The method of claim 5, wherein determining that the multicast packet requires routing to the one or more recipients of the multicast packet includes determining, by the first router, that the one or more recipients of the multicast traffic are present on a different network from a network of the first router.

7. The method of claim 1, wherein sending the Protocol Independent Multicast prune message reduces inefficient bandwidth utilization between the first router and the second router.

8. An apparatus comprising a computing device, a computer processor, and a computer memory operatively coupled to the computer processor, the computer memory having disposed within it computer program instructions that, when executed by the computer processor, cause the apparatus to carry out the steps of:

receiving, at a first interface of a first router from a second router, a multicast packet for a multicast group;

determining whether a time to live (TTL) value of the multicast packet is equal to zero; and sending, in response to determining that the TTL value of the multicast packet is equal to zero, a Protocol Independent Multicast prune message on the first interface of the first router, wherein the Protocol Independent Multicast prune message comprises a request to stop receiving multicast traffic for the multicast group.

9. The apparatus of claim 8, wherein the multicast packet identifies the multicast group and a source IP address, and wherein sending the Protocol Independent Multicast prune message comprises including in the Protocol Independent Multicast prune message the source IP address and the multicast group.

10. The apparatus of claim 8, further comprising:

receiving, by the second router, the Protocol Independent Multicast prune message from the first router;

prohibiting, based on the Protocol Independent Multicast prune message, subsequent multicast traffic for the multicast group to the first router;

determining, by the second router, whether there are any additional recipients of the multicast traffic coupled to the second router; and propagating, in response to determining there are not additional recipients of the multicast traffic coupled to the second router, the Protocol Independent Multicast prune message upstream.

11. The apparatus of claim 8, wherein the first router, in response to receiving the multicast packet, decrements the TTL value.

12. The apparatus of claim 8, further comprising determining, by the first router, that the multicast packet requires routing to one or more recipients of the multicast packet.

13. The apparatus of claim 12, wherein determining that the multicast packet requires routing to the one or more recipients of the multicast packet includes determining, by the first router, that the one or more recipients of the multicast traffic are present on a different network from a network of the first router.

14. The apparatus of claim 8, wherein sending the Protocol Independent Multicast prune message reduces inefficient bandwidth utilization between the first router and the second router.

15. A computer program product comprising a non-volatile computer readable storage medium and computer program instructions stored therein that are configured to, when executed by a processor, cause a computer to perform operations comprising:

receiving, at a first interface of a first router from a second router, a multicast packet for a multicast group;

determining whether a time to live (TTL) value of the multicast packet is equal to zero; and sending, in response to determining that the TTL value of the multicast packet is equal to zero, a Protocol Independent Multicast prune message on the first interface of the first router, wherein the Protocol Independent Multicast prune message comprises a request to stop receiving multicast traffic for the multicast group.

16. The computer program product of claim 15, wherein the multicast packet identifies the multicast group and a source IP address, and wherein sending the Protocol Independent Multicast prune message comprises including in the Protocol Independent Multicast prune message the source IP address and the multicast group.

17. The computer program product of claim 15, further comprising:

receiving, by the second router, the Protocol Independent Multicast prune message from the first router;

prohibiting, based on the Protocol Independent Multicast prune message, subsequent multicast traffic for the multicast group to the first router;

determining, by the second router, whether there are any additional recipients of the multicast traffic coupled to the second router; and propagating, in response to determining there are not additional recipients of the multicast traffic coupled to the second router, the Protocol Independent Multicast prune message upstream.

18. The computer program product of claim 15, wherein the first router, in response to receiving the multicast packet, decrements the TTL value.

19. The computer program product of claim 15, further comprising determining, by the first router, that the multicast packet requires routing to one or more recipients of the multicast packet.

20. The computer program product of claim 19, wherein determining that the multicast packet requires routing to the one or more recipients of the multicast packet includes determining, by the first router, that the one or more recipients of the multicast traffic are present on a different network from a network of the first router.

* * * * *